(12) United States Patent
Kitagata

(10) Patent No.: US 8,531,711 B2
(45) Date of Patent: Sep. 10, 2013

(54) PRINT SERVER, CONTROL METHOD THEREOF, CLIENT TERMINAL, PRINTING SYSTEM, AND COMPUTER-READABLE MEDIUM

(75) Inventor: Kei Kitagata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 13/225,344

(22) Filed: Sep. 2, 2011

(65) Prior Publication Data

US 2012/0062946 A1    Mar. 15, 2012

(30) Foreign Application Priority Data

Sep. 15, 2010  (JP) .................................. 2010-207154

(51) Int. Cl.
*G06F 3/12*      (2006.01)

(52) U.S. Cl.
USPC ......... 358/1.15; 358/1.14; 358/1.13; 713/323

(58) Field of Classification Search
USPC ....... 358/1.13–1.16; 709/219, 205; 715/251; 713/323
See application file for complete search history.

(56) References Cited

U.S. PATENT DOCUMENTS

| | | | |
|---|---|---|---|
| 6,631,407 B1 * | 10/2003 | Mukaiyama et al. | ......... 709/223 |
| 7,538,902 B2 | 5/2009 | Kurotsu et al. | |
| 7,719,703 B2 | 5/2010 | Kurotsu et al. | |
| 8,248,636 B1 * | 8/2012 | Dayan | .......................... 358/1.15 |
| 8,375,086 B2 * | 2/2013 | Flavin | .......................... 709/205 |
| 2001/0024518 A1 * | 9/2001 | Yaguchi | .......................... 382/170 |
| 2002/0036793 A1 * | 3/2002 | Roosen et al. | ............... 358/1.15 |
| 2003/0002077 A1 * | 1/2003 | Shima | .......................... 358/1.15 |
| 2010/0208298 A1 * | 8/2010 | Kitagata | ..................... 358/1.15 |
| 2011/0235085 A1 * | 9/2011 | Jazayeri et al. | ............... 358/1.14 |

FOREIGN PATENT DOCUMENTS

JP    2003-337681 A    11/2003

* cited by examiner

*Primary Examiner* — Tammy Pham
*Assistant Examiner* — Dennis Dicker
(74) *Attorney, Agent, or Firm* — Fitzpatrick, Cella, Harper & Scinto

(57) ABSTRACT

A print server comprises: a list request receiving unit configured to receive, from a client terminal, a printer list request containing information indicating a printer capable of printing; an acquisition unit configured to send a request to a printer to acquire a status indicating whether the printer can print, thereby acquiring the status; and a sending unit configured to send, to the client terminal that has sent the printer list request, printer list data described in a format for display on a Web browser of the client terminal using the status of the printer that has been acquired by the acquisition unit, wherein when the acquisition unit cannot acquire the status of the printer, the sending unit sends the printer list data containing a command which allows the Web browser of the client terminal to inquire a status of a printer whose status cannot be acquired.

10 Claims, 16 Drawing Sheets

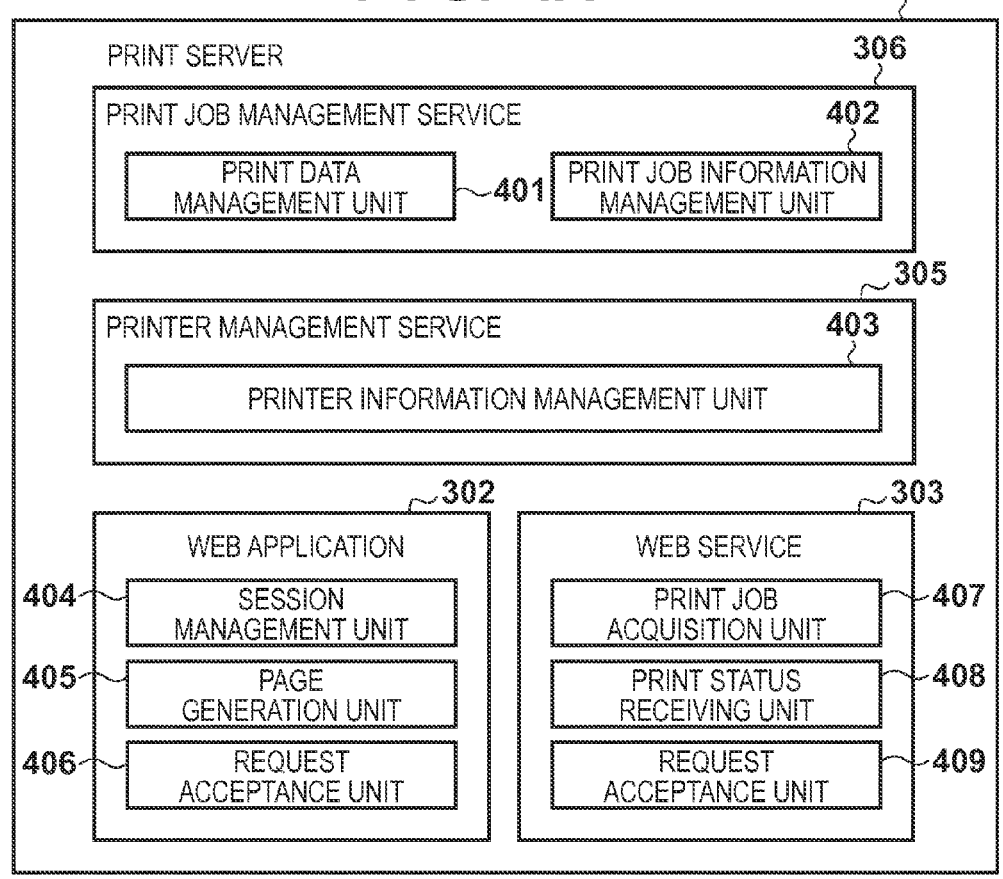
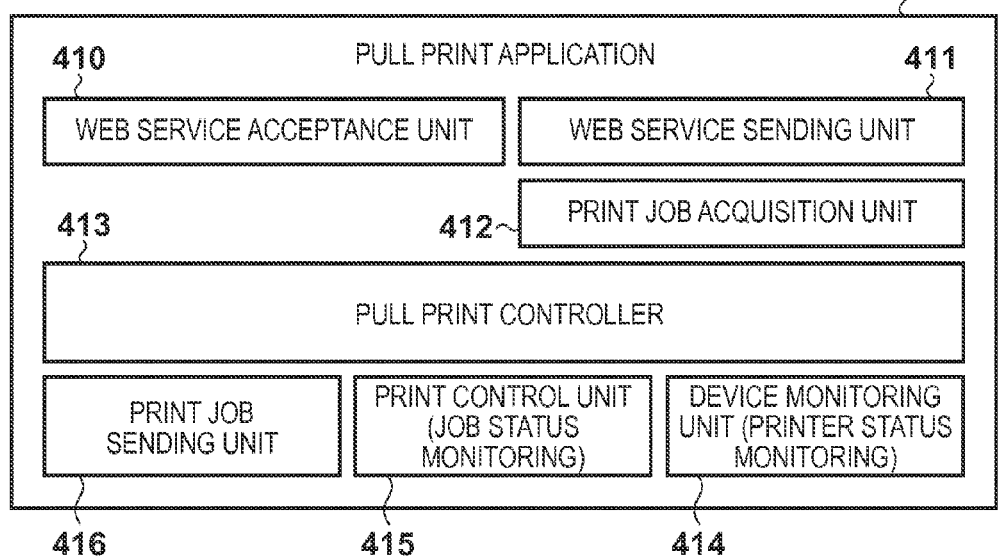

FIG. 5

| | PRINTER INFORMATION | | |
|---|---|---|---|
| 502 | PRINTER NAME | ... | PRINTER NAME |
| 503 | PRINTER IDENTIFICATION INFORMATION | ... | PRINTER IDENTIFICATION INFORMATION |
| 504 | STATUS | ... | STATUS |
| 505 | USER | ... | USER |
| | ⋮ | ⋮ | ⋮ |

<PRINTER LIST> 602, 601, 604

| PRINT | PRINTER NAME | STATUS |
|---|---|---|
| ☐ | PRINTER A | NORMAL |
| ☐ | PRINTER B | NORMAL |
| ☐ | PRINTER C | NORMAL |

603

[EXECUTE] 605

FIG. 6B

<PRINTER LIST> 606

| PRINT | PRINTER NAME | STATUS |
|---|---|---|
| ☐ | PRINTER A | NORMAL |
| ☐ | PRINTER B | NORMAL |
| ☐ | PRINTER C | PAPER JAM |

[EXECUTE] 607

FIG. 6C

<PRINT SETTINGS> 608

| | PRINT SETTINGS : | ●ALL ○DESIGNATE PAGES |
| | NUMBER OF COPIES : | 1  COPIES |
| | PRINTING METHOD : | DOUBLE-SIDED PRINTING |
| | PAPER SOURCE : | AUTO |
| | PRIORITY : | ..... |

609

[PRINT] 610

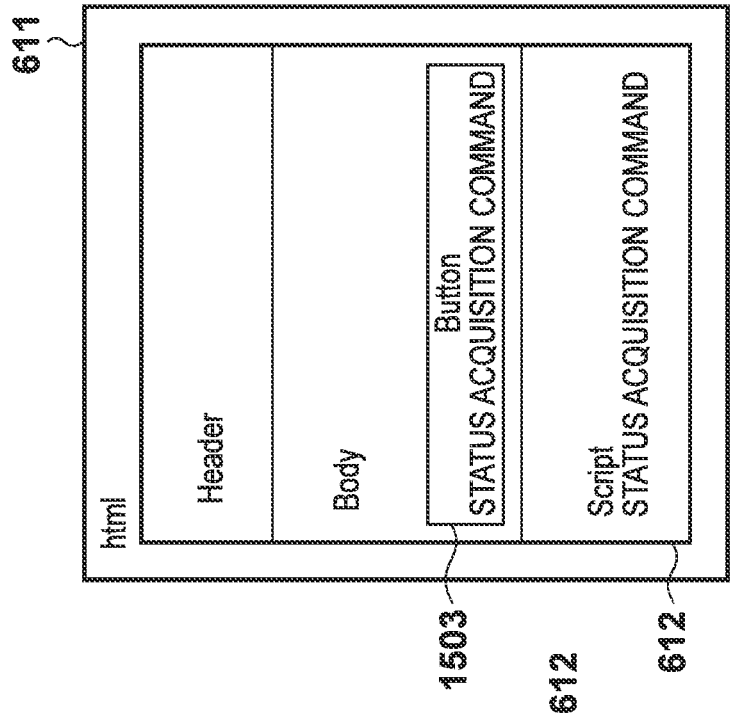
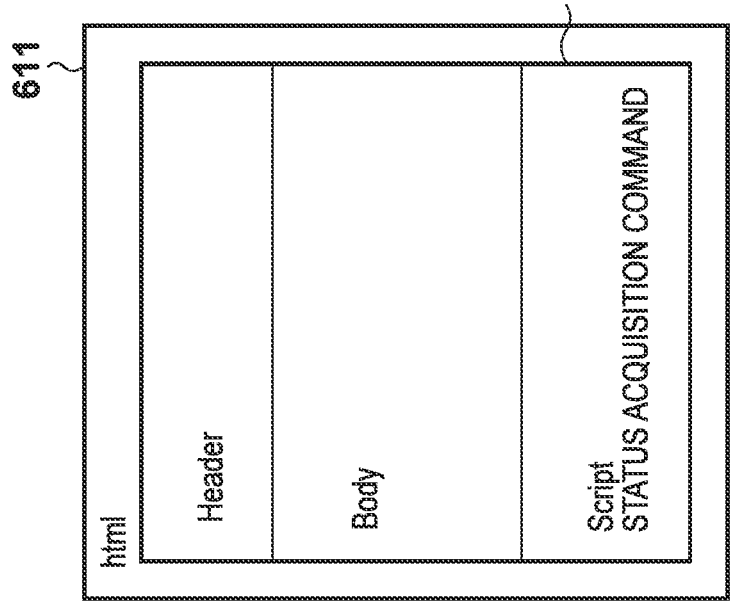

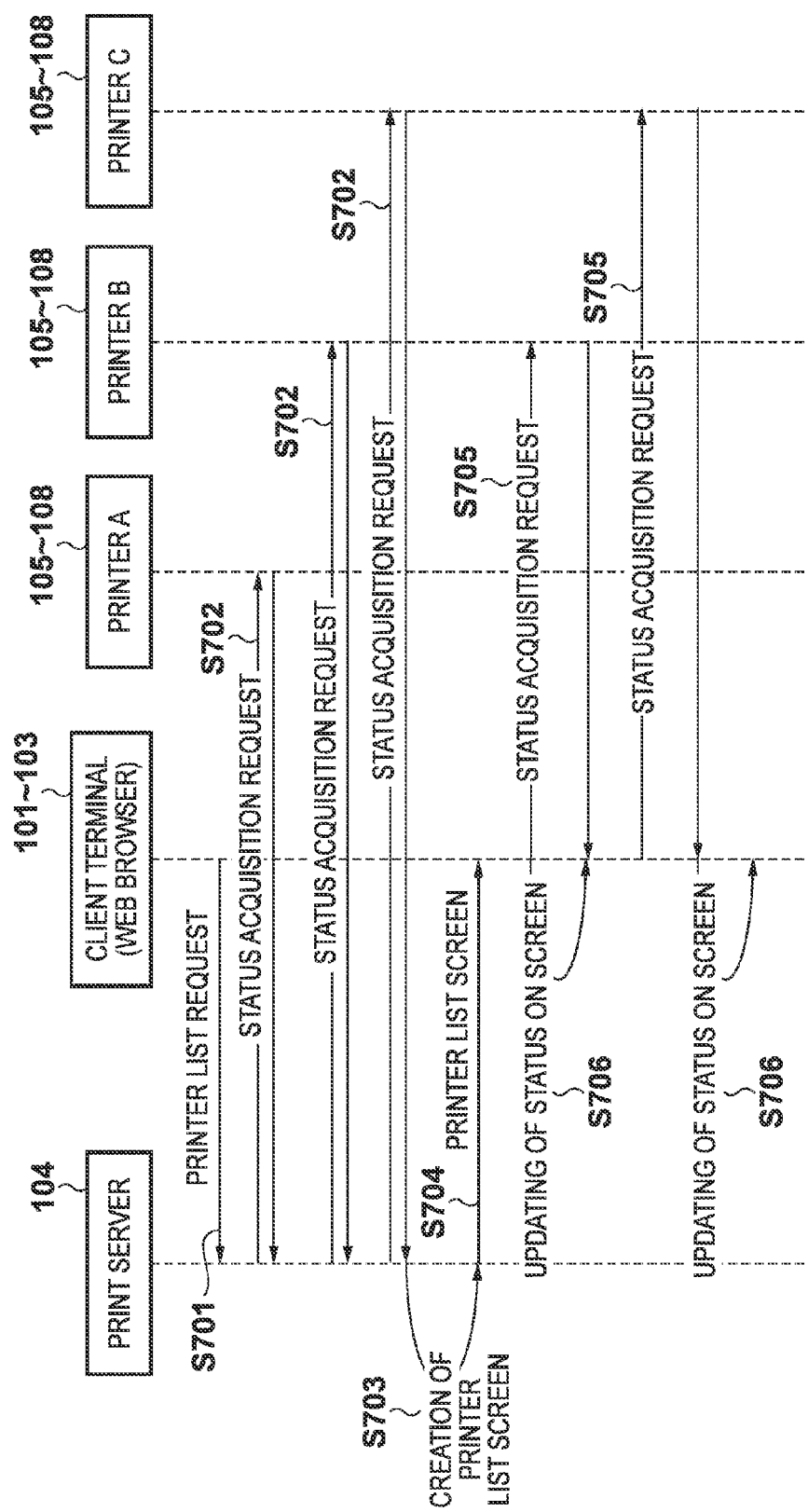

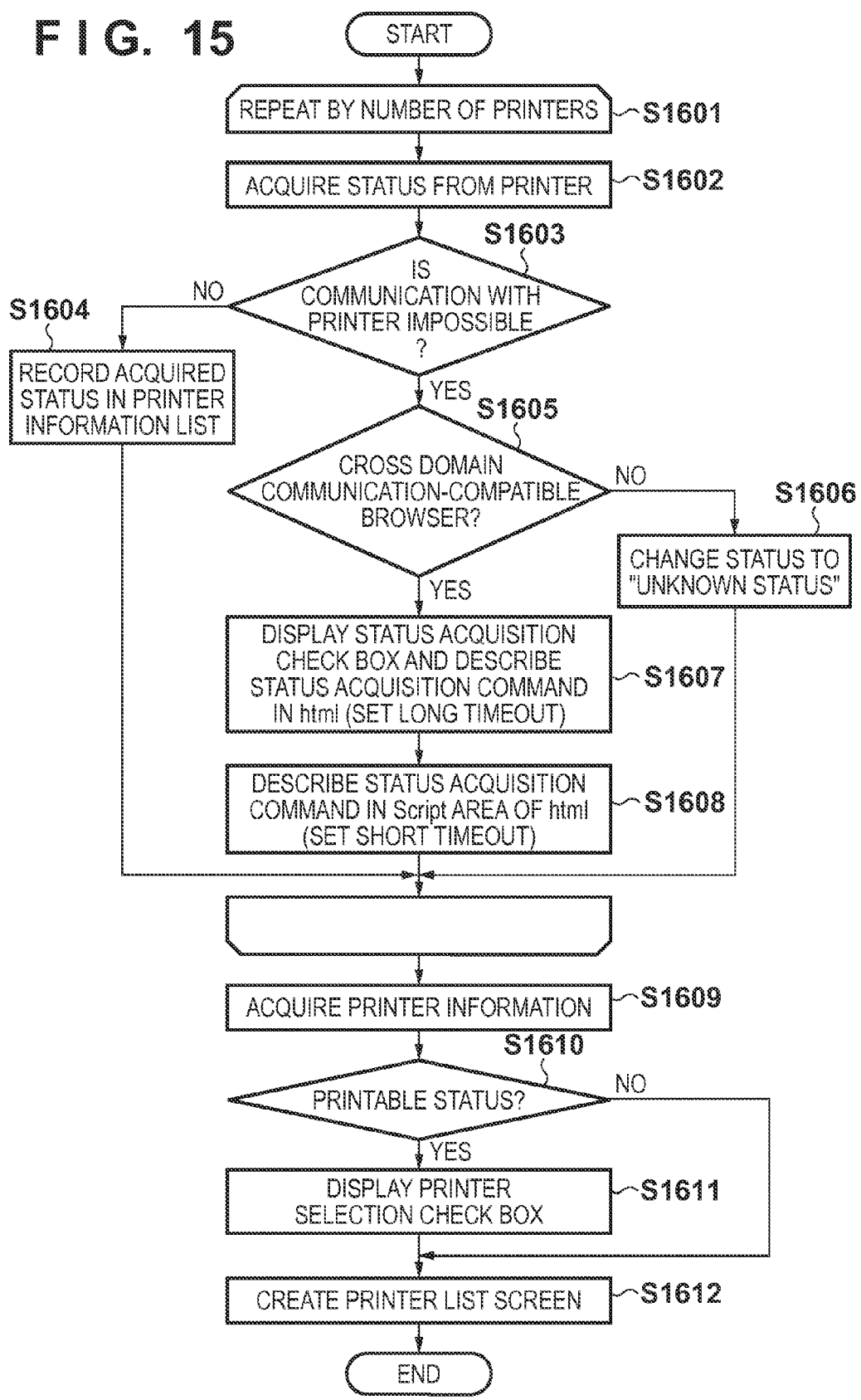

PRINT SERVER, CONTROL METHOD THEREOF, CLIENT TERMINAL, PRINTING SYSTEM, AND COMPUTER-READABLE MEDIUM

BACKGROUND OF THE INVENTION

1. Field of the Invention

The present invention relates to a method of performing printer status acquisition processing by a client terminal which designates execution of pull printing in a printing system, especially a pull printing system.

2. Description of the Related Art

Recently, the publicizing of services on the Internet as cloud services has become an expanding business. Providing services as cloud services has various advantages such that the need for hardware management for each customer can be obviated by installing a wide variety of servers in a large-scale data center, and a resource can be easily added in accordance with the load on the server. Along with this, even the function of a print server needs to be provided as a print service on the Internet. This boosts a demand for an environment where a printer acquires print data from the print server via the Internet to perform pull type printing (pull printing).

A printing system in which a print server and printer exist within an intranet is capable of push type printing (push printing). In this printing, the print server directly communicates with the printer to acquire a printer status (for example, printable, power off, paper jam, or no paper). Then, the print server directly sends print data to the printer. In this environment, when the user selects a printer before printing, he can select it based on the printer status. A prior art for preventing illicit printing by presenting a list of printers capable of printing to the user before printing is, for example, Japanese Patent Laid-Open No. 2003-337681. Japanese Patent Laid-Open No. 2003-337681 proposes a method in which the print server sends a list of printers capable of printing to the printer, and the printer acquires the printer list and updates the held printer list using the new list of printers capable of printing that has been sent from the print server.

A print server expanded as a cloud service on the Internet resides in an environment where the print server communicates with a printer over a firewall. In this case, the print server cannot directly acquire a printer status. Unless the printer status can be acquired correctly, a list of printers capable of printing cannot be presented correctly.

SUMMARY OF THE INVENTION

It is an objective of the present invention to provide a processing method of acquiring a printer status before printing and presenting a list of printers capable of printing even in an environment where a print server cannot directly communicate with a printer.

According to one aspect of the present invention, there is provided a print server in a printing system including a client terminal having a Web browser, the print server, and a printer, comprising: a list request receiving unit configured to receive, from the client terminal, a printer list request containing information indicating a printer capable of printing; an acquisition unit configured to send a request to the printer to acquire a status indicating whether the printer can print, thereby acquiring the status; and a sending unit configured to send, to the client terminal that has sent the printer list request, printer list data described in a format for display on the Web browser of the client terminal using the status of the printer that has been acquired by the acquisition unit, wherein when the acquisition unit cannot acquire the status of the printer, the sending unit sends the printer list data containing a command which allows the Web browser of the client terminal to inquire a status of a printer whose status cannot be acquired.

According to another aspect of the present invention, there is provided a client terminal in a printing system including the client terminal having a Web browser, a print server, and a printer, comprising: a list request sending unit configured to send a printer list request to the print server; a status acquisition unit configured to acquire a status from the printer in accordance with a command contained in printer list data received from the print server; an update unit configured to update the printer list data received from the print server using the status acquired by the status acquisition unit; and a display unit configured to display, by using the printer list data updated by the update unit, the printer list and an item that allows a user to select, on the Web browser, a printer capable of printing contained in the printer list.

According to another aspect of the present invention, there is provided a printing system including a client terminal having a Web browser, a print server, and a printer, wherein the print server includes a list request receiving unit configured to receive, from the client terminal, a printer list request containing information indicating a printer capable of printing, an acquisition unit configured to send a request to the printer to acquire a status indicating whether the printer can print, thereby acquiring the status, and a sending unit configured to send, to the client terminal that has sent the printer list request, printer list data described in a format for display on the Web browser of the client terminal using the status of the printer that has been acquired by the acquisition unit, when the acquisition unit cannot acquire the status of the printer, the sending unit sends the printer list data containing a command which allows the Web browser of the client terminal to inquire a status of a printer whose status cannot be acquired, and the client terminal includes a list request sending unit configured to send a printer list request to the print server, a status acquisition unit configured to acquire a status from the printer in accordance with the command contained in the printer list data received from the print server, an update unit configured to update the printer list data received from the print server using the status acquired by the status acquisition unit, and a display unit configured to display, by using the printer list data updated by the update unit, the printer list and an item that allows a user to select, on the Web browser, a printer capable of printing contained in the printer list.

According to another aspect of the present invention, there is provided a printing system including a client terminal having a Web browser, a print server, and a printer, wherein the print server includes a list request receiving unit configured to receive, from the client terminal, a printer list request containing information indicating a printer capable of printing, an acquisition unit configured to send a request to the printer to acquire a status indicating whether the printer can print, thereby acquiring the status, and a sending unit configured to send, to the client terminal that has sent the printer list request, printer list data described in a format for display on the Web browser of the client terminal using the status of the printer that has been acquired by the acquisition unit, when the acquisition unit cannot acquire the status of the printer, the sending unit sends the printer list data containing a command which allows the Web browser of the client terminal to inquire a status of a printer whose status cannot be acquired, the client terminal includes a list request sending unit configured to send a printer list request to the print server, an inquiry unit configured to inquire the status of the printer in accordance with the command contained in the printer list data received from the print server, and an update request unit configured to request the print server to update the printer list, the printer includes a notification unit configured to notify the print server of the status of the printer in accordance with an inquiry from the client terminal, and the sending unit of the print server updates the printer list data using the status notified by the notification unit of the printer, and sends the updated printer list data to the client terminal in accordance with an update request from the client terminal.

According to another aspect of the present invention, there is provided a method of controlling a print server in a printing system including a client terminal having a Web browser, the print server, and a printer, comprising: a list request receiving step of causing a list request receiving unit to receive, from the client terminal, a printer list request containing information indicating a printer capable of printing; an acquisition step of causing an acquisition unit to send a request to the printer to acquire a status indicating whether the printer can print, thereby acquiring the status; and a sending step of causing a sending unit to send, to the client terminal that has sent the printer list request, printer list data described in a format for display on the Web browser of the client terminal using the status of the printer that has been acquired in the acquisition step, wherein in the sending step, when the status of the printer cannot be acquired in the acquisition step, the printer list data containing a command which allows the Web browser of the client terminal to inquire a status of a printer whose status cannot be acquired is sent.

According to another aspect of the present invention, there is provided a non-transitory computer-readable medium storing a program for causing a computer to function as a list request receiving unit which receives, from the client terminal, a printer list request containing information indicating a printer capable of printing, an acquisition unit which sends a request to the printer to acquire a status indicating whether the printer can print, thereby acquiring the status, and a sending unit which sends, to the client terminal that has sent the printer list request, printer list data described in a format for display on the Web browser of the client terminal using the status of the printer that has been acquired by the acquisition unit, wherein when the acquisition unit cannot acquire the status of the printer, the sending unit sends the printer list data containing a command which allows the Web browser of the client terminal to inquire a status of a printer whose status cannot be acquired.

According to the present invention, the status of a printer which cannot directly communicate with a print server is acquired via a Web browser which issues a print instruction. The printer status can be acquired before printing, presenting a list of printers capable of printing.

Further features of the present invention will become apparent from the following description of exemplary embodiments (with reference to the attached drawings).

BRIEF DESCRIPTION OF THE DRAWINGS

FIGS. 4A and 4B are block diagrams showing the software configurations of the print server and a pull print application;

FIG. 5 is a table showing printer information managed by the print server;

FIGS. 6A, 6B, 6C, 6D, and 6E are views each exemplifying a Web browser screen;

FIGS. 7A and 7B are views each exemplifying the data structure of screen data;

FIG. 8 is a chart showing a sequence between the print server, the client terminal, and the printer according to the first embodiment;

FIG. 15 is a flowchart showing the operation sequence of a print server according to the third embodiment.

DESCRIPTION OF THE EMBODIMENTS

First Embodiment

Figure 1:
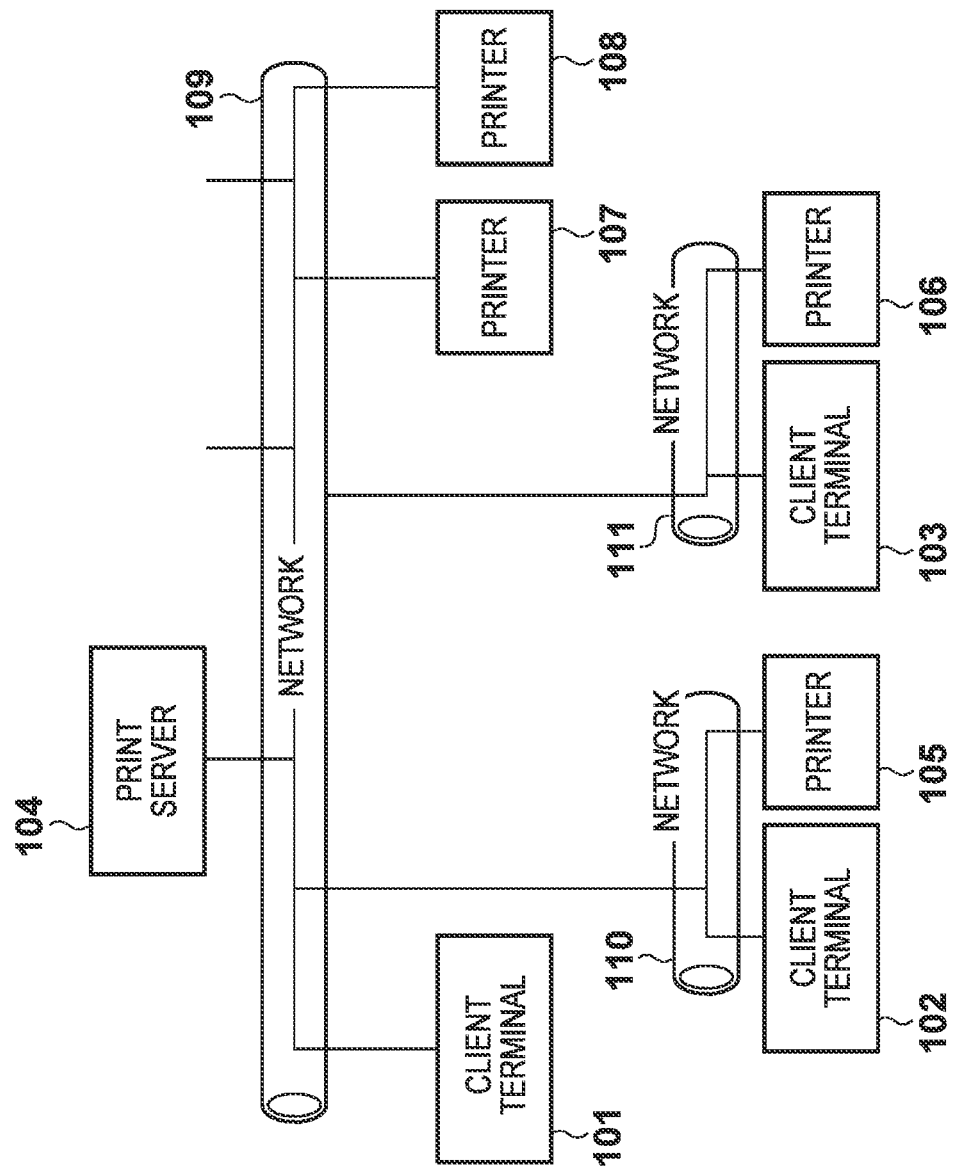
FIG. 1 is a block diagram showing a network configuration.

Embodiments of the present invention will now be described with reference to the accompanying drawings. FIG. 1 is a block diagram showing the overall configuration of a printing system according to the embodiment of the present invention. Referring to FIG. 1, client terminals 101 to 103, a print server 104, and printers 105 to 108 are connected via networks 109 to 111. In FIG. 1, assume that a plurality of client terminals 101 to 103 and a plurality of printers 105 to 108 are connected. The networks 109 to 111 are any of a LAN, a WAN, a telephone line, a dedicated digital line, an ATM, a frame relay line, a cable television line, a data broadcasting radio channel, and the like such as the Internet. Alternatively, the networks 109 to 111 are so-called communication networks implemented by a combination of them. The networks 109 to 111 suffice to send and receive data. Communication unit from the client terminals 101 to 103 to the print server 104 and the printers 105 to 108 may differ from those from the printers 105 to 108 to the print server 104.

The client terminals 101 to 103 are formed from a desktop personal computer, notebook personal computer, mobile personal computer, PDA (Personal Data Assistant), and the like. The client terminals 101 to 103 may be cell phones incorporating a program execution environment. The client terminals 101 to 103 incorporate an environment where a program such as a Web browser (Internet browser, WWW browser, or browser for using World Wide Web) is executed.

The print server 104 receives output destination printer list requests from the Web browsers of the client terminals 101 to 103, and then acquires statuses from the printers 105 to 108. Further, the print server 104 sends back commands to the Web browsers to acquire statuses by the client terminals 101 to 103 from the printers 105 to 108 in accordance with the status acquisition state. Also, the print server 104 receives information for identifying a document to be printed, and output destination printers from the Web browsers of the client terminals 101 to 103 together with print requests. Then, the print server 104 sends back response screens containing print instruction commands to the Web browsers of the client terminals 101 to 103. The Web browsers of the client terminals 101 to 103 issue the received print commands to designated printers. Upon receiving the print commands from the Web browsers of the client terminals 101 to 103, the printers 105 to 108 acquire document data to be printed from the print server 104, and print them.

Although not shown in FIG. 1, assume that firewalls are interposed between the respective printers, the respective client terminals, and the print server. The firewall has a function of controlling communication between apparatuses, and is set to pass only necessary communication in terms of security and the like. In the embodiment, the firewall function enables direct communication between the print server and the client terminal, but controls for each network whether direct communication between the print server and the printer is impossible/possible. Note that a client terminal and printer arranged in a single network (for example, an intranet or LAN) can directly communicate with each other.

If the print server and printer communicate with each other via the firewall, the print server can directly acquire a status from the printer unless communication is restricted.

[Hardware Configuration]

Figure 2:
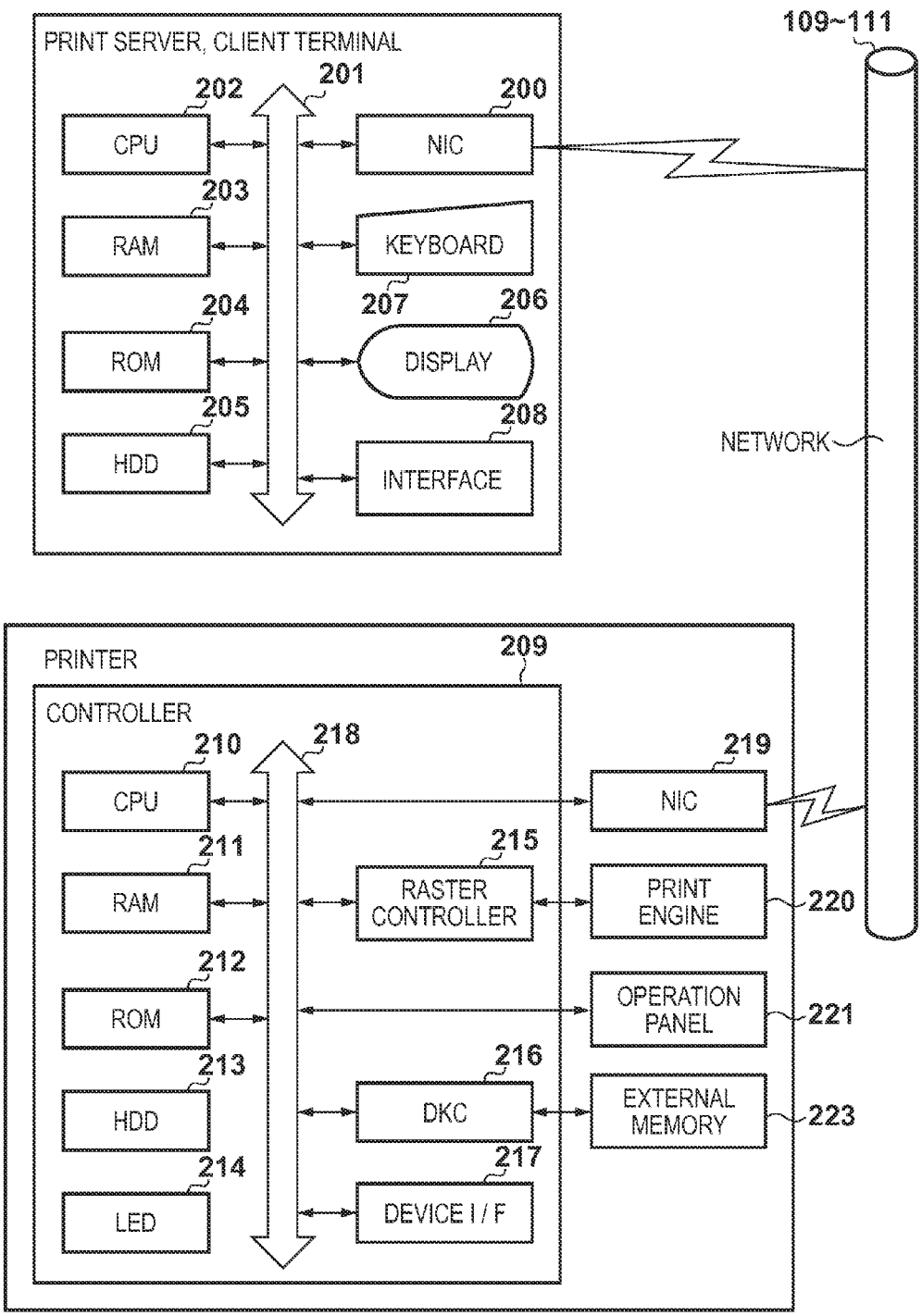
FIG. 2 is a block diagram showing the hardware configurations of a print server, client terminal, and printer.

FIG. 2 is a block diagram showing the hardware configurations of the client terminals 101 to 103, the print server 104, and the printers 105 to 108 in the printing system according to the embodiment of the present invention. First, the hardware configuration of the print server and client terminal will be described with reference to FIG. 2. A CPU 202 controls the whole apparatus. The CPU 202 performs control to execute an application program, OS, and the like stored in a hard disk (HDD) 205 and temporarily store, in a RAM 203, information, files, and the like necessary to execute the programs. A ROM 204 is a storage unit which stores programs such as a basic I/O program, and various data such as print data used for print processing and printer information. The RAM 203 is a temporary storage unit which functions as a main memory, work area, and the like for the CPU 202. The HDD 205 is one of external storage units, and functions as a large-capacity memory. The HDD 205 stores application programs such as a Web browser, a print server program, an OS, related programs, and the like.

A display 206 is a display unit which displays a command input from a keyboard 207, a printer status, and the like. An external device I/F 208 is used to connect a printer, USB device, and peripheral device. The keyboard 207 is an instruction input unit. A system bus 201 manages a data flow within the print server in the printing system. A network interface card (NIC) 200 exchanges data with an external apparatus via the networks 109 to 111. This computer configuration is merely an example, and the configuration is not limited to the configuration example in FIG. 2. For example, the storage destination of data and programs can be changed to the ROM, RAM, HDD, or the like in accordance with their features.

The hardware configuration of the printer will be described with reference to FIG. 2. A controller 209 in each of the printers 105 to 108 controls the printer control system. A CPU 210 which controls the overall apparatus comprehensively controls accesses to various devices connected to a system bus 218. Control by the CPU 210 is based on a control program and the like which are stored in a ROM 212, or a control program, resource data (resource information), and the like which are stored in an external memory 223 connected via a disk controller (DKC 216).

A RAM 211 functioning as a main memory, work area, and the like for the CPU 210 can expand the memory capacity by an optional RAM (not shown) connected to an expansion port (not shown). An HDD 213 is an external storage unit functioning as a large-capacity memory, and stores a pull print application program, related programs, and the like. An operation panel (operation unit) 221 includes a user interface and pull print switching button for performing a pull print operation. The operation panel 221 also includes buttons and a display unit such as a liquid crystal panel or LED 214 for setting the operation mode of a corresponding one of the printers 105 to 108 and the like, displaying the operation status of a corresponding one of the printers 105 to 108, and performing an operation such as copy designation.

A printer exchanges data with an external apparatus via a network interface card (NIC) 219. A print engine 220 shown in FIG. 2 adopts a known printing technique. In the embodiment, examples are an electrophotographic method (laser beam method), inkjet method, and sublimation (thermal transfer) method. A raster controller 215 converts print data of the PDL or PDF language into image data. A device I/F 217 is a connection I/F with an external device connectable via a USB or the like.

[System Configuration]

Figure 3:
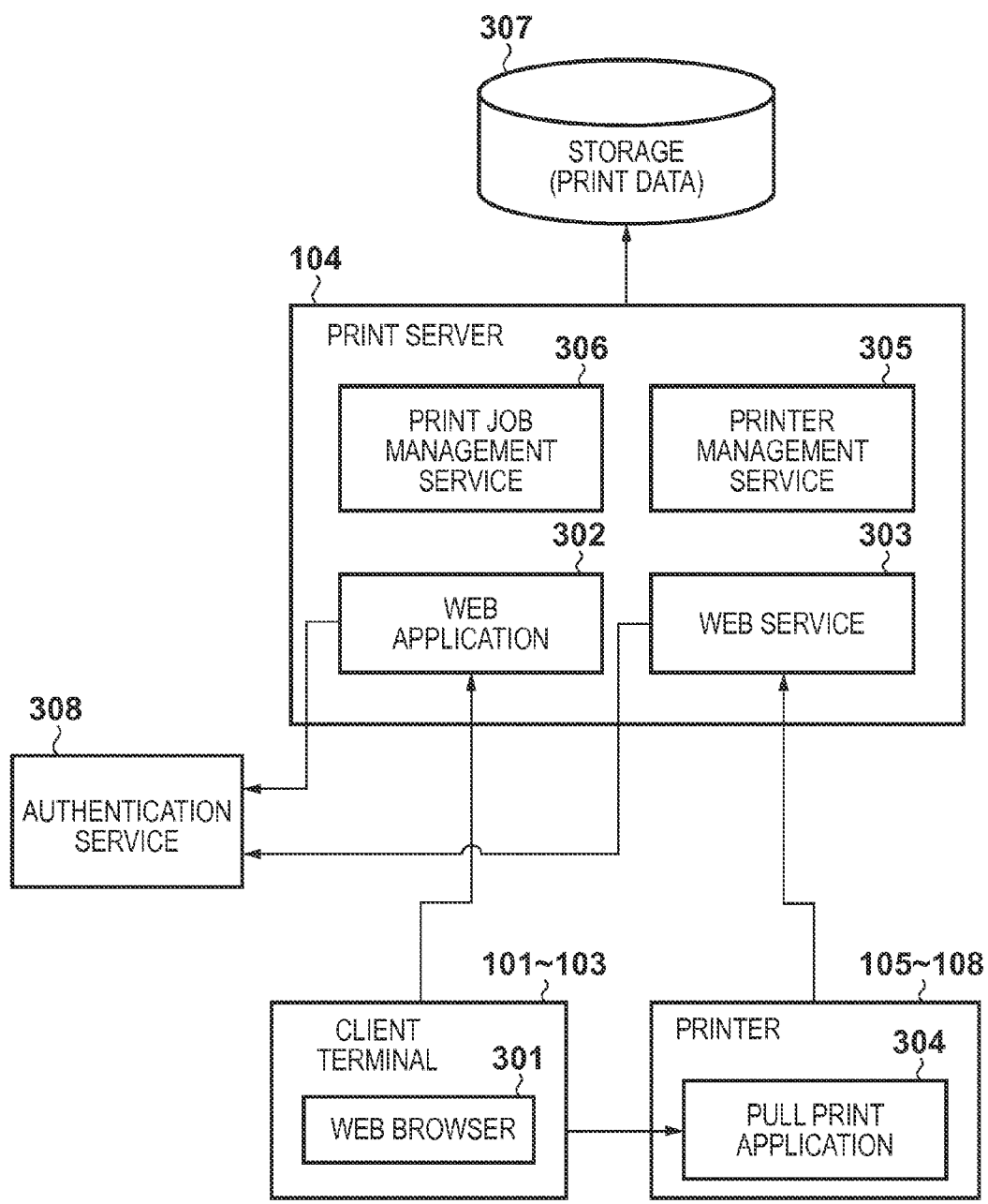
FIG. 3 is a block diagram showing the module configurations of the print server, client terminal, and printer.

FIG. 3 is a block diagram showing the system configuration of the printing system according to the embodiment of the present invention. The print server 104 includes a print job management service 306 for managing a print job. This service manages document data or the like input by another service or another program as print data in a storage 307. The data format of the print data is, for example, PDL (Page Description Language) or PDF (Portable Document Format). The storage 307 is a storage device such as an HDD incorporated in the information processing apparatus of the print server 104, an externally connected HDD, or a network storage. A printer management service 305 manages the printers 105 to 108, and manages printer information in FIG. 5 (to be described later) for each printer.

A Web application 302 creates a Web page displayable on a Web browser 301 running on each of the client terminals 101 to 103, and sends back the created Web page in response to a request from the Web browser 301. In response to a status acquisition request from a pull print application 304 in each of the printers 105 to 108, a Web service 303 sends back the status of the printer. The Web service 303 sends back a print job in response to a print job acquisition request, and receives a job status in print processing. The pull print application 304 in each of the printers 105 to 108 accepts a status acquisition request or print request from the Web browser 301.

The print job management service 306, printer management service 305, Web application 302, and Web service 303 are independent programs, and can be arranged in separate information processing apparatuses. Although the print server 104 includes all the services in FIG. 3, the respective services may be arranged in separate information processing apparatuses. Alternatively, a plurality of image processing apparatuses may implement one service. The respective services may be implemented to communicate and cooperate with each other.

[Software Configuration]

FIGS. 4A and 4B are block diagrams showing the software configuration of the printing system according to the embodiment of the present invention. First, the software configuration of the print server 104 will be described with reference to FIG. 4A. A print data management unit 401 of the print job management service 306 in the print server 104 manages print data. Upon receiving a print data acquisition request from the Web service 303, the print data management unit 401 acquires designated print data from the storage 307, and transfers it to the Web service 303. A print job information management unit 402 manages print job information of print data managed in the storage 307. The job information is formed from pieces of information such as the job identification ID for identifying print data, document name, job type for identifying a data format such as PDL or PDF, print status, acceptance date & time, final print date & time, user name, page count, page size, and print data link destination. The print status includes statuses such as waiting, transferring, printing, normal end, and error end.

A printer information management unit 403 in the printer management service 305 manages printer information shown in FIG. 5 (to be described later). Upon accepting a print request from the Web browser 301, the Web application 302 notifies the printer management service 305 of a message to this effect. Upon receiving the notification from the Web application 302, the printer management service 305 acquires statuses from the printers 105 to 108 based on printer identification information 503 of the printer information. The status is acquired from, out of the printers 105 to 108, only a printer for which a user who has issued a print request via the Web browser 301 matches a user 505 of the printer information. The printer management service 305 records the acquired status in a status 504 of the printer information and manages it.

A session management unit 404 in the Web application 302 manages, as a session, a request from the Web browser 301 for which an authentication service 308 has established an authentication. A page generation unit 405 creates a Web screen like screen examples shown in FIGS. 6A to 6E (to be described later) in response to a request from the Web browser 301, and sends it back to the Web browser 301. A request acceptance unit 406 accepts a printer list acquisition request (step S701), print request (not shown), and the like from the Web browser 301.

A request acceptance unit 409 in the Web service 303 accepts a print job acquisition request and print job status from the pull print application 304. When the request acceptance unit 409 accepts a print job acquisition request, a print job acquisition unit 407 issues a print data acquisition request to the print job management service 306. When the request acceptance unit 409 accepts a print job status, a print status receiving unit 408 notifies the print job management service 306 of the status.

The configuration of the pull print application 304 in the printer will be described with reference to FIG. 4B. A Web service acceptance unit 410 in the pull print application 304 accepts a status acquisition request (step S702), print request (not shown), and the like from the Web browser 301. A Web service sending unit 411 notifies the Web service 303 of the print job acquisition request or print status. Upon accepting a print request or the like from the Web browser 301, a print job acquisition unit 412 acquires a print job from the Web service 303 via the Web service sending unit 411, and sends it to a print job sending unit 416. The print job sending unit 416 sends print data to the controller 209. A print control unit 415 receives a print job status from the controller 209, and notifies the Web service 303 of it.

Upon accepting a request from the print server 104 or Web browser 301 to acquire the status of a corresponding one of the printers 105 to 108, a device monitoring unit 414 acquires a printer status from the controller 209 and notifies the print server 104 or Web browser 301 of it. The printer status is managed by the status of the printer information shown in FIG. 5 (to be described later). A pull print controller 413 manages the overall operation of the pull print application 304, and operation instructions and the like are issued to respective units via this controller.

[Printer Information]

FIG. 5 exemplifies printer information managed by the printer management service 305 in the printing system according to the embodiment. Printer information 501 manages pieces of printer information of the printers 105 to 108 that are managed in the print server 104. A printer name 502 is information displayed as a printer name 603 on printer list screens 601 and 606 in screen examples shown in FIGS. 6A to 6E on the Web browser 301.

The printer identification information 503 is information for uniquely identifying each printer, and is an IP address, MAC address, URI (Uniform Resource Identifier), or the like. The status 504 indicates a printer status. Examples of the status are the absence of paper, paper jam, opening of the cover, the absence of toner, full discharge bin, full hard disk, other errors, warming-up, calibrating, initializing, off-line, sleep, printing, printable, and unknown status. The user 505 is user information registered in the authentication service 308, and information for identifying a user who operates the Web browser 301. These items of the printer information 501 are merely examples, and another item may be added, as needed. For example, date & time information and printer location may be managed. Assume that printer information to be managed has been registered in advance in the print server.

[Examples of Web Screen]

FIGS. 6A to 6C exemplify Web screens which are created by the Web application 302 and displayed on the Web browser 301 of each of the client terminals 101 to 103 in the printing system according to the embodiment.

When the Web browser 301 sends a printer list request to the print server 104, the print server 104 creates the printer list screen 601 shown in FIG. 6A and sends it to the Web browser 301. A check box 602 is used when the user selects a printer to print. The display of the check box 602 is controlled as follows. First, the Web browser 301 sends a printer list request to the print server 104. The print server 104 acquires statuses from the pull print applications 304 of the printers 105 to 108, and holds the acquired statuses in the status 504 of the printer information 501. For a printer whose status has been acquired, the acquired status is described in a status 604 in printer list information. When the status is a printable one, the check box 602 is displayed to select this printer.

The printer name 603 describes the printer name 502 of the printer information 501. When the user designates an execution button 605, the Web browser 301 sends a print setting request to the print server 104. The print server 104 creates a print setting screen 608 shown in FIG. 6C, and sends it back to the Web browser 301. The print setting screen 608 is a screen for setting print attributes 609. When the user designates a print button 610, the Web browser 301 sends, to the print server 104, print attribute information designated by the user on the print setting screen 608. The print server 104 adds the accepted designated print attribute information to print data. Further, the print server 104 sends, to the Web browser 301, a screen (not shown) containing information described in a script language to send a print command to a printer designated by the check box 602. There are various kinds of script languages, and JavaScript® will be exemplified.

Referring to FIG. 7A, an html structure 611 exemplifies the html structure of the printer list screen. The embodiment assumes the following two conditions that printer list information contains a status acquisition command 612.

(1) The Web browser 301 which has sent a request has a JavaScript cross domain communication function (or equivalent function).

(2) There is a printer whose status cannot be acquired by the print server 104 from the pull print application 304.

When these two conditions are satisfied, the status acquisition command 612 is described in the Script area of the html structure 611. Note that the Web screen example is described in the HTML format, but another format (for example, another XML (eXtensible Markup Language) is also usable.

Status acquisition commands are described by the number of printers whose statuses cannot be acquired by the print server 104. The status acquisition command is executed when the Web browser 301 displays the printer list screen 601. By executing the status acquisition command, statuses are acquired from the Web browser 301 for the pull print applications 304 of the printers 105 to 108 whose statuses have not been acquired by the print server 104. The Web browser 301 updates the printer list screen 606 shown in FIG. 6C using the acquired printer statuses. When the status is a printable one, a printer selection check box is displayed as represented by the printer list screen 606.

Note that the status acquisition command defines processing of acquiring and updating a status, like the printer list screen 606. The structure of the html description for displaying a screen on the Web browser 301 by the print server 104 is not limited to the html structure 611 shown in FIG. 7A. Even the conditions that the html description contains a status acquisition command described in JavaScript are not limited to the above ones. For example, even if the print server and printer can directly communicate with each other, the status acquisition command may be contained to acquire the latest printer status via the Web browser based on the elapsed time after previous status acquisition or the like. The conditions may be changed in accordance with network congestion.

[Operation Sequence]

FIG. 8 is a chart showing the operation sequence of the print server 104, client terminals 101 to 103, and printers 105 to 108 in the printing system according to the first embodiment.

In step S701, the Web browser 301 of one of the client terminals 101 to 103 sends a printer list request to the print server 104. This implements sending of a list request from the client terminal and reception of the list request by the print server. In step S702, the print server 104 sends a status acquisition request to the pull print applications 304 of the printers 105 to 108 based on the printer information 501. In response to the status acquisition request from the print server 104, the device monitoring unit 414 in each pull print application 304 inquires a printer status of the controller 209, acquires it, and sends it back to the print server 104. At this time, the status acquisition request from the print server 104 may not be able to be sent/received depending on firewall restrictions, the network status, or the like. In FIG. 8, the print server 104 cannot directly acquire the statuses of printers B and C. Whether the status can be acquired can be determined based on whether a response to the status acquisition request has been received from each printer within a specific time. The specific time indicates a timeout value defined in advance.

In step S703, the print server 104 creates the printer list screen 601 containing the status 604 for a printer whose status has been acquired, and the status acquisition command 612 for a printer whose status has not been acquired. In step S704, the print server 104 sends back the printer list screen to the Web browser 301 which has sent the printer list request. In step S705, the Web browser 301 displays the printer list screen and at the same time, sends a status acquisition request to a printer for which the status acquisition command is to be executed. In step S706, the Web browser 301 receives a status from the printer and updates the status in the printer list screen. An example of the status-updated screen is the printer list screen 606 shown in FIG. 6B.

[Reply Operation Sequence]

Figure 9:
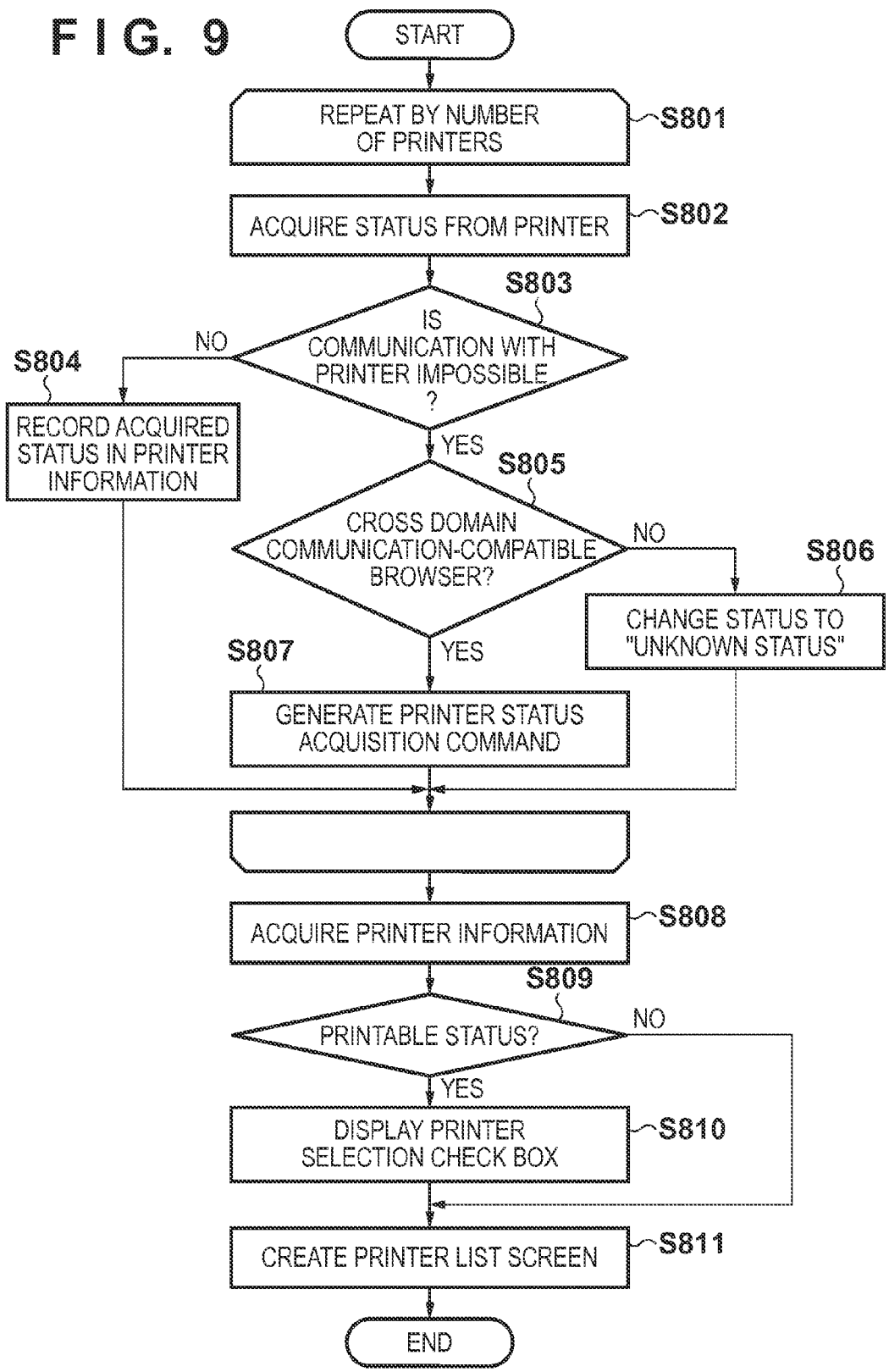
FIG. 9 is a flowchart showing the operation sequence of the print server according to the first embodiment.

FIG. 9 shows an operation sequence until the print server 104 replies to the Web browser 301 upon receiving a printer list request from the Web browser 301 of one of the client terminals 101 to 103 in the printing system according to the first embodiment. In the embodiment, this processing sequence is implemented by reading out a program stored in a storage unit such as the ROM 204 to the RAM 203 and executing it by the CPU 202 of the print server 104.

In step S801, the print server 104 repeats processes in steps S802 to S807 by the number of printers registered in the print server 104 by a user who requests acquisition of a printer list. Assume that the printers 105 to 108 have been registered in the print server 104. In step S802, the print server 104 requests acquisition of the statuses of the printers 105 to 108. If the print server 104 can communicate with the printers 105 to 108 and acquire their statuses (NO in step S803), it holds the acquired statuses in the printer information 501 in step S804. In the first embodiment, when the print server 104 sends a status acquisition request to the printer and does not receive a response within a predetermined time, it is determined that communication with the printer is impossible. If the print server 104 cannot communicate with the printer (YES in step S803), it determines in step S805 whether the requesting Web browser 301 has a JavaScript cross domain communication function (or equivalent function). If the Web browser 301 does not have a cross domain communication function (NO in step S805), the print server 104 changes the status 504 to an unknown status in step S806. If the Web browser 301 has a cross domain communication function (YES in step S805), the print server 104 generates the status acquisition command 612 in step S807.

In step S808, the print server 104 acquires the printer name 502 and status 504 of the printer information 501 from the printer management service 305. In step S809, the print server 104 determines whether the status 504 of the printer is a printable status. If the printer status is a printable one (YES in step S809), the print server 104 displays the check box 602 in step S810, and advances to step S811. If the printer status is an unprintable one (NO in step S809), the print server 104 advances to step S811. In step S811, the print server 104 creates the printer list screen 601 containing the status acquisition command 612 created in step S807. Then, the processing sequence ends.

[Display Processing Sequence]

Figure 10:
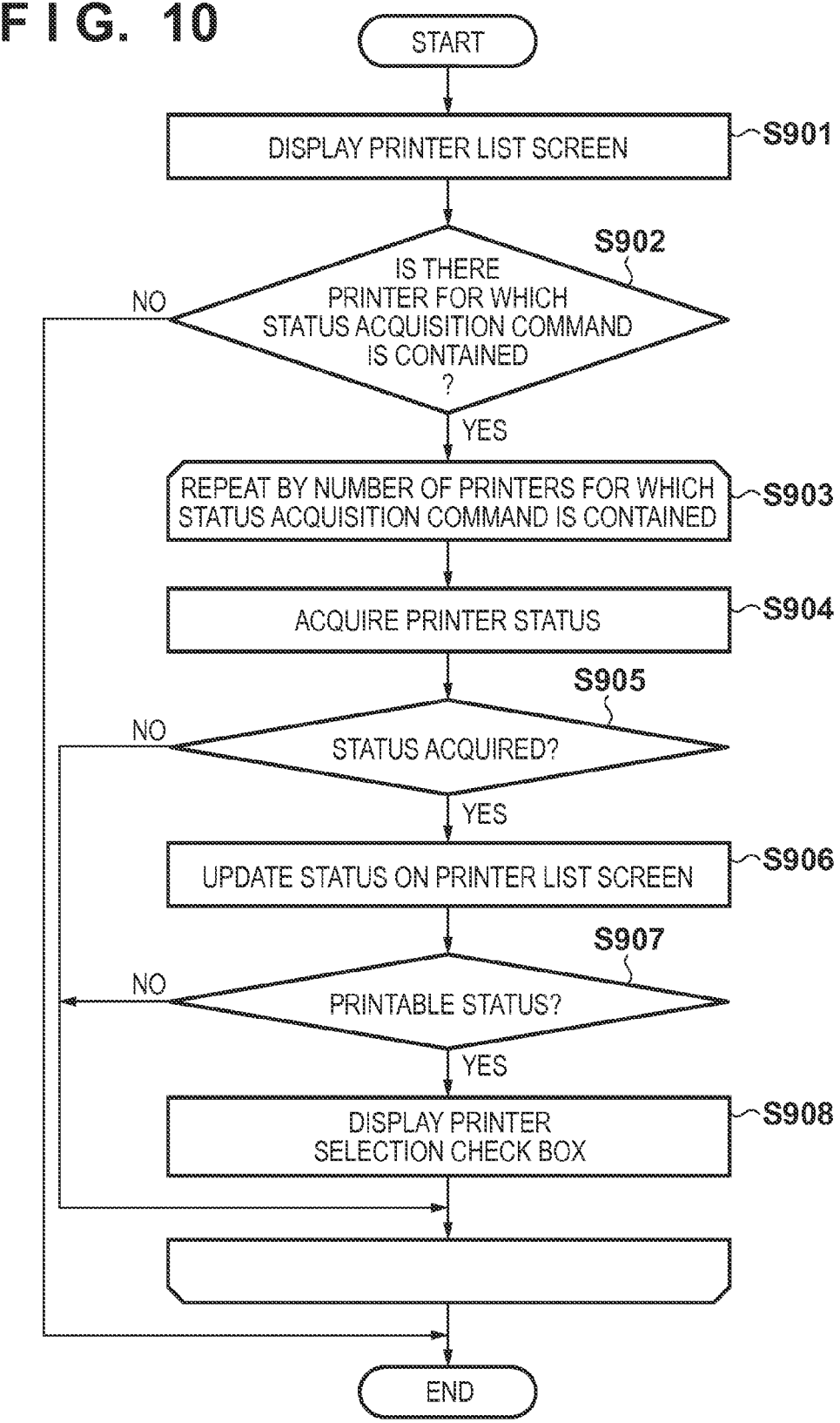
FIG. 10 is a flowchart showing the operation sequence of a Web browser according to the first embodiment.

FIG. 10 shows an operation sequence when the Web browser 301 of one of the client terminals 101 to 103 displays the printer list screen 601 in the printing system according to the first embodiment. In the embodiment, this processing sequence is implemented by reading out a program stored in a storage unit such as the ROM 204 to the RAM 203 and executing it by the CPU 202 of the client terminal.

In step S901, the Web browser 301 displays the printer list screen 601. In step S902, the Web browser 301 determines whether a printer for which information of the printer list screen 601 contains the status acquisition command 612 exists among printers displayed in the printer list screen 601 received from the print server 104. If no status acquisition command is contained (NO in step S902), the processing sequence ends. If the status acquisition command is contained (YES in step S902), the Web browser 301 repeats, in step S903, processes in steps S904 to S908 by the number of printers for which the status acquisition command 612 is contained. In step S904, the Web browser 301 sends the status acquisition command 612 to the acquisition target printer. In step S905, the Web browser 301 determines whether the status has been acquired from the printer subjected to the status acquisition command 612. If no status has been acquired (NO in step S905), the Web browser 301 shifts to processing of the next acquisition target printer. If the status has been acquired (YES in step S905), the Web browser 301 updates the status 604 in the printer list screen 601 in step S906. In step S907, the Web browser 301 determines whether the status is a printable one. If the status is an unprintable one (NO in step S907), the Web browser 301 shifts to processing of the next acquisition target printer. If the status is a printable one (YES in step S907), the Web browser 301 displays the check box 602 in step S908. The Web browser 301 then shifts to processing of the next acquisition target printer. Upon completion of processing for all the status acquisition target printers, the Web browser 301 ends the processing sequence.

[Status Acquisition Processing Sequence]

Figure 11:
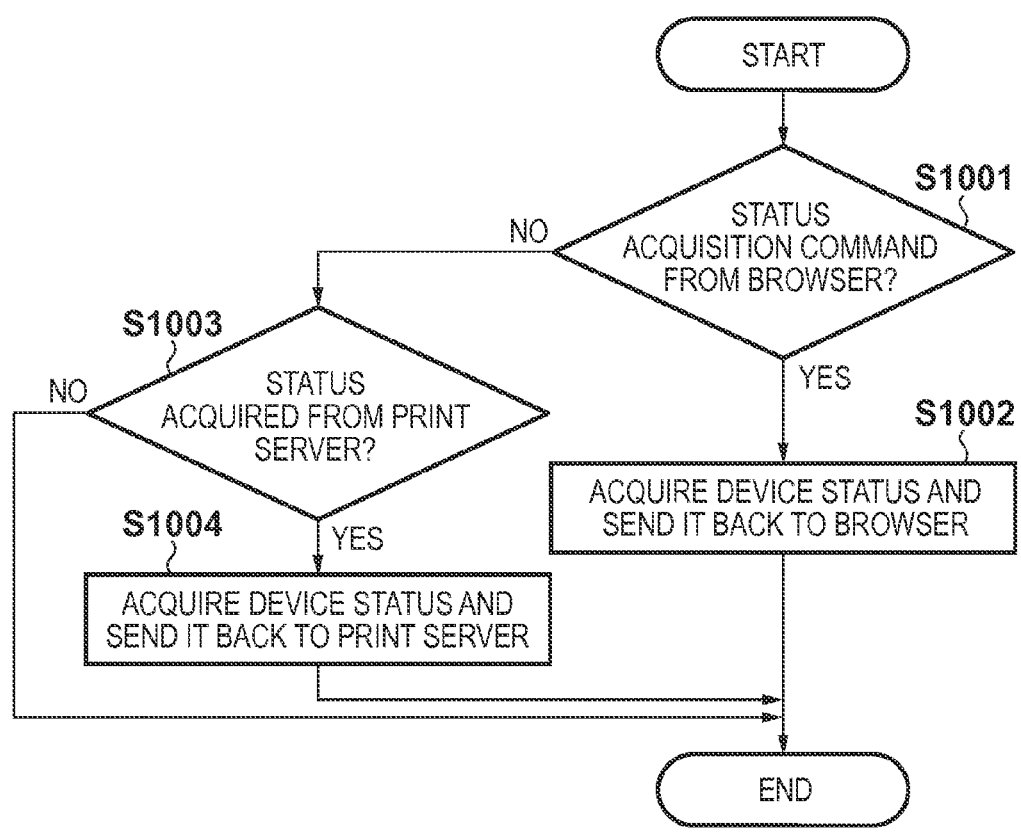
FIG. 11 is a flowchart showing the operation sequence of the pull print application according to the first embodiment.

FIG. 11 shows an operation sequence when the pull print application 304 in one of the printers 105 to 108 receives the status acquisition command 612 from the Web browser 301 in the printing system according to the first embodiment. In the embodiment, this processing sequence is implemented by reading out a program stored in a storage unit such as the ROM 212 to the RAM 211 and executing it by the CPU 210 of the printer.

In step S1001, the pull print application 304 accepts a request from the Web browser 301, and determines whether the request is the status acquisition command 612. If the request is the status acquisition command 612 from the Web browser 301 (YES in step S1001), the device monitoring unit 414 acquires the device status of a corresponding one of the printers 105 to 108 from the controller 209 in step S1002, and notifies the Web browser 301 of it. The processing then ends.

If the request is not the status acquisition command 612 from the Web browser 301 (NO in step S1001), the pull print application 304 determines in step S1003 whether the request is a status acquisition request from the print server 104. If the request is not the status acquisition request 612 from the print server 104 (NO in step S1003), the processing ends. If the request is the status acquisition command 612 from the print server 104 (YES in step S1003), the device monitoring unit 414 acquires the device status of a corresponding one of the printers 105 to 108 from the controller 209 in step S1004, and notifies the Web browser 301 of it. After that, the processing ends.

By the above processing, when the pull print application 304 accepts the status acquisition command 612 from the Web browser 301, it sends back a status to the Web browser 301. When the pull print application 304 accepts the status acquisition command 612 from the print server 104, it sends back a status to the print server 104. The pull print application 304 does not reply to other requests.

As described above, the status of even a printer which cannot directly communicate with the print server can be acquired via the Web browser which issues a print instruction. The printer status can be acquired before printing, presenting a list of printers capable of printing.

Second Embodiment

The second embodiment in which upon receiving a status acquisition command 612 from a Web browser 301, a pull print application 304 sends back a status not to the Web browser 301 but to a print server 104 will be described. In the second embodiment, establishment of communication from printers 105 to 108 to the print server 104 can also be confirmed by sending back statuses to the print server 104.

[Operation Sequence]

Figure 12:
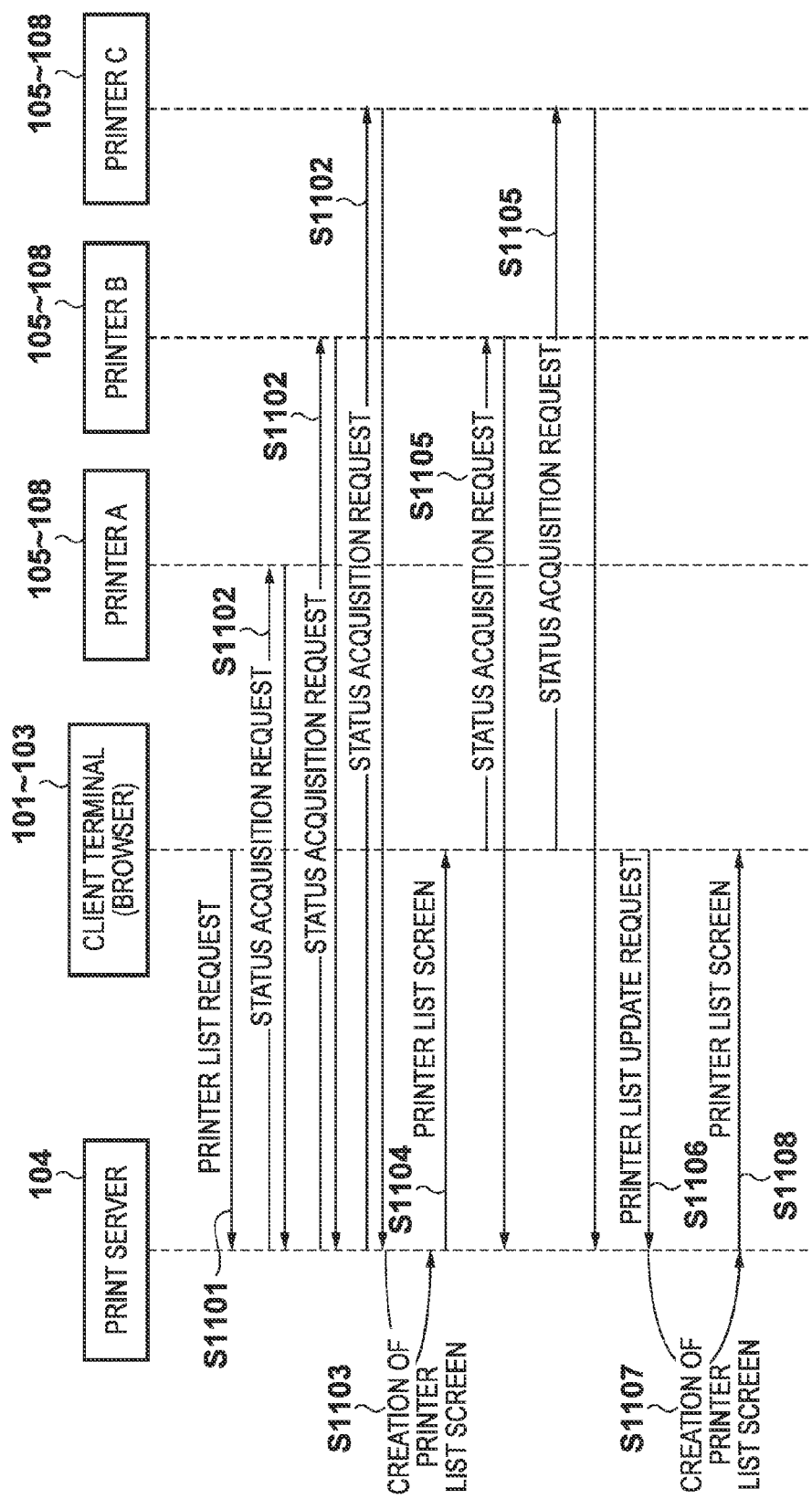
FIG. 12 is a chart showing a sequence between a print server, a client terminal, and a printer according to the second embodiment.

FIG. 12 is a chart showing the operation sequence of the print server 104, client terminals 101 to 103, and the printers 105 to 108 in a printing system according to the second embodiment. FIG. 12 corresponds to FIG. 8 described in the first embodiment.

In step S1101, the Web browser 301 of one of the client terminals 101 to 103 sends a printer list request to the print server 104. In step S1102, the print server 104 sends a status acquisition request to the pull print applications 304 of the printers 105 to 108 based on printer information 501. In response to the status acquisition request from the print server 104, a device monitoring unit 414 in the pull print application 304 of each printer inquires a printer status of a controller 209, acquires it, and sends it back to the print server 104. At this time, the status acquisition request from the print server 104 may not be able to be sent/received depending on firewall restrictions, the network status, or the like. In FIG. 12, the print server 104 cannot directly acquire the statuses of printers B and C. Whether the status can be acquired can be determined based on whether a response to the status acquisition request has been received from each printer within a specific time.

In step S1103, the print server 104 creates a printer list screen 601 containing a status 604 for a printer whose status has been acquired, and the status acquisition command 612 for a printer whose status has not been acquired. In step S1104, the print server 104 sends back the printer list screen to the Web browser 301 which has sent the printer list request. In step S1105, the Web browser 301 displays the printer list screen and at the same time, sends a status acquisition request to a printer for which the status acquisition command 612 is to be executed. In the pull print application 304 of the printer for which the status acquisition command 612 is to be executed, the device monitoring unit 414 inquires a printer status of the controller 209, acquires it, and sends it back to the print server 104 in response to the request. The print server 104 updates a status 504 of the printer information 501 using the acquired information. In step S1106, the Web browser 301 sends a printer list update request to the print server 104. This implements a client terminal update request. In step S1107, the print server 104 creates the printer list screen 601 based on the printer information 501. In step S1108, the print server 104 sends back the printer list screen to the Web browser 301.

[Example of Display Screen]

Figure 6D:
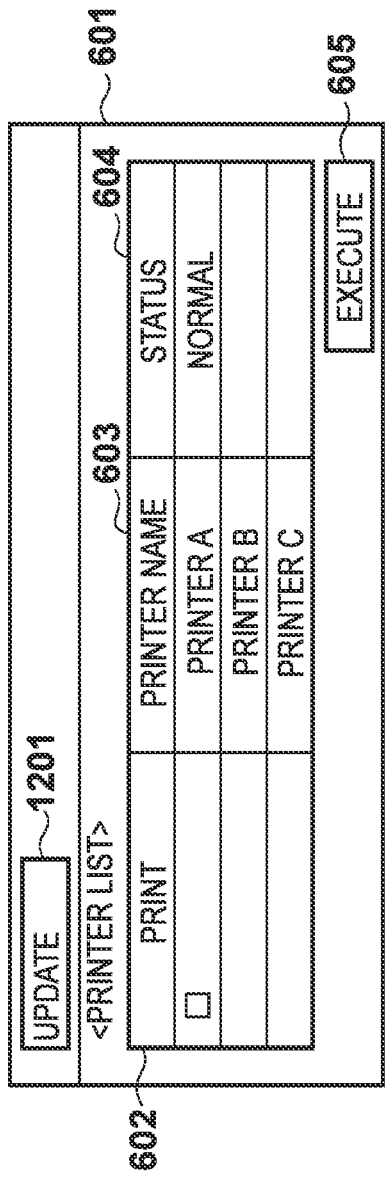

FIG. 6D exemplifies a Web screen which is created by a Web application 302 and displayed on the Web browser 301 of one of the client terminals 101 to 103 in the printing system according to the second embodiment. A difference from the screen shown in FIG. 6A will be explained.

When an update button 1201 is designated, the Web browser 301 sends the printer list update request in step S1106 to the Web application 302 of the print server 104. The Web application 302 acquires the latest printer information 501, creates a printer list screen, and sends it back to the Web browser 301.

Note that the timing when the Web browser 301 of the client terminal sends the printer list update request to the print server 104 in step S1106 may be defined in advance. For example, in step S1105, the printer list update request may be sent to the print server 104 a predetermined time after the Web browser 301 sends a status acquisition request to each printer. Based on the obtained information, for example, automatic screen update may be done.

[Reply Processing Sequence]

Figure 13:
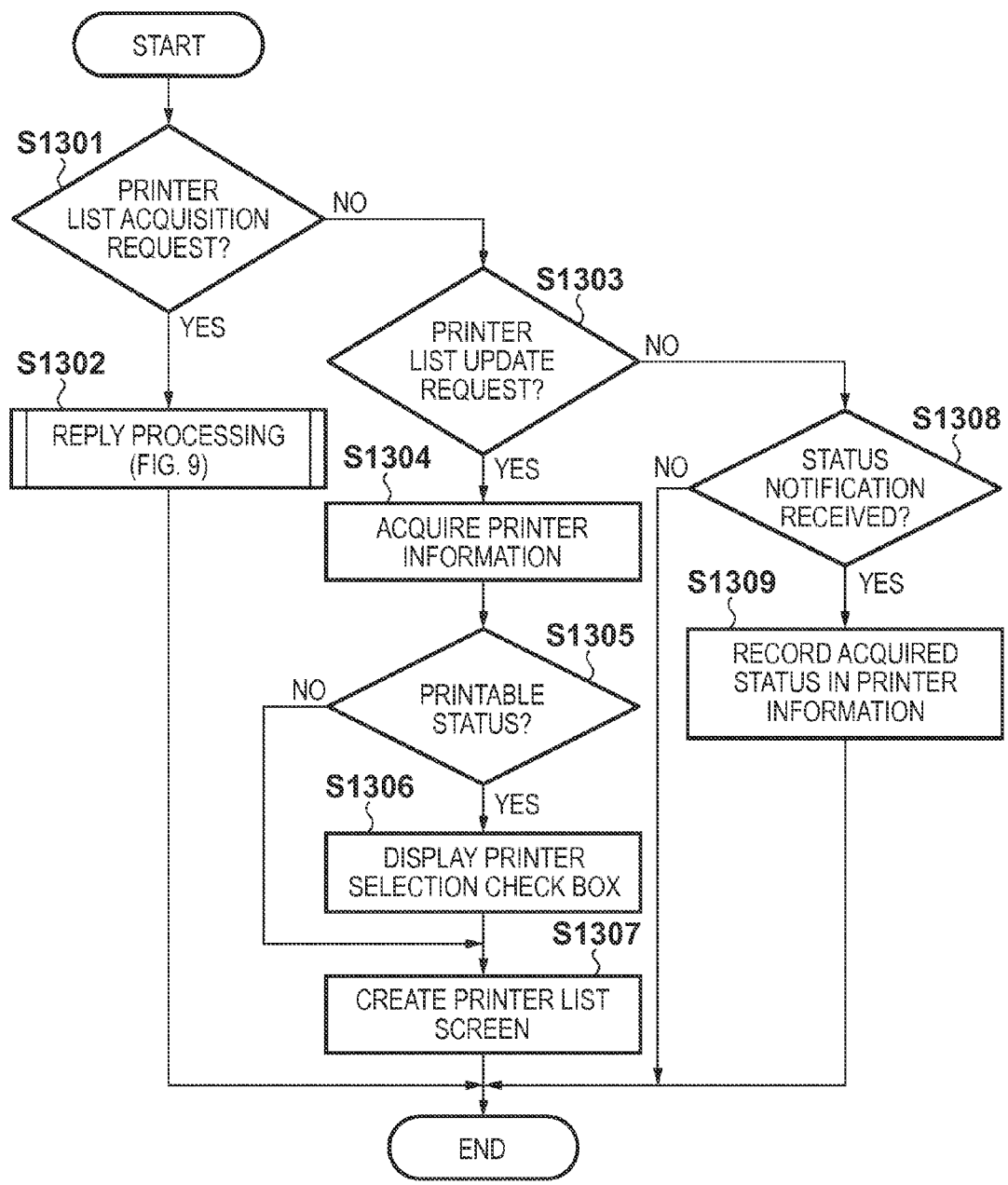
FIG. 13 is a flowchart showing the operation sequence of the print server according to the second embodiment.

FIG. 13 shows an operation sequence until the print server 104 replies to the Web browser 301 upon receiving a printer list request from the Web browser 301 of one of the client terminals 101 to 103 in the printing system according to the second embodiment. In the embodiment, this processing sequence is implemented by reading out a program stored in a storage unit such as a ROM 204 to a RAM 203 and executing it by a CPU 202 of the print server 104.

In step S1301, the print server 104 determines whether the received request is a printer list acquisition request. If the received request is a printer list acquisition request (YES in step S1301), the print server 104 executes in step S1302 the reply processing sequence in FIG. 9 described in the first embodiment. If the received request is not a printer list acquisition request (NO in step S1301), the print server 104 determines in step S1303 whether the received request is a printer list update request. If the received request is a printer list update request (YES in step S1303), the print server 104 acquires a printer name 502 and the status 504 of the printer information 501 from a printer management service 305 in step S1304. The printer list update request is issued by designating the update button 1201 shown in FIG. 6D via the Web browser 301.

In step S1305, the print server 104 determines whether the status 504 is a printable status. If the status 504 is a printable status, the print server 104 displays a check box 602 in step S1306 to generate a printer list screen. The print server 104 then creates the printer list screen 601.

If the received request is not a printer list update request (NO in step S1303), the print server 104 determines in step S1308 whether the received request is a status notification request from the pull print application 304. If the received request is a status notification request (YES in step S1308), the print server 104 updates the status 504 of the printer information 501 using the acquired status in step S1309. The processing sequence then ends. If the received request is not a status notification request (NO in step S1308), the processing sequence ends.

[Status Acquisition Processing Sequence]

Figure 14:
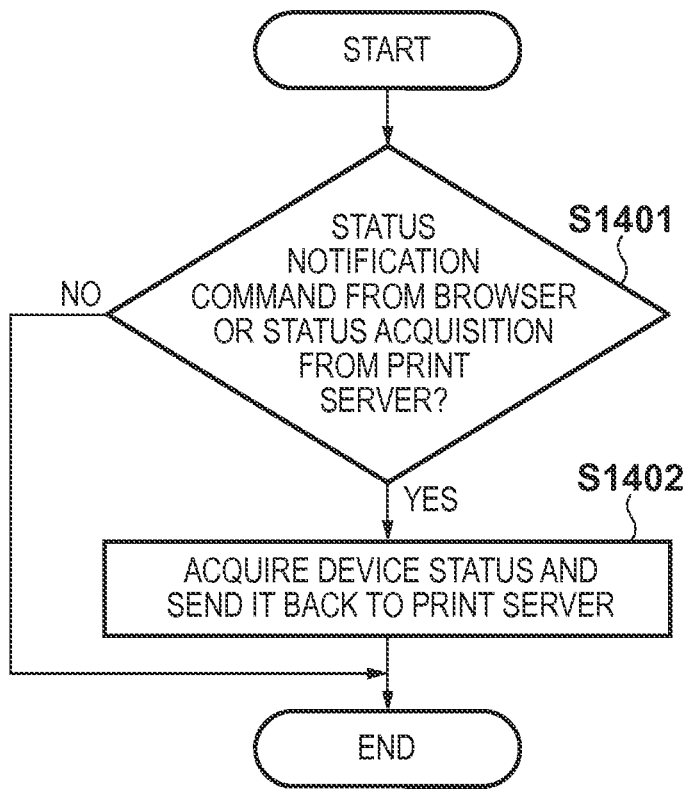
FIG. 14 is a flowchart showing the operation sequence of a pull print application according to the second embodiment.

FIG. 14 shows an operation sequence when the pullprint application 304 in one of the printers 105 to 108 receives the status acquisition command 612 from the Web browser 301 in the printing system according to the second embodiment. In the embodiment, this processing sequence is implemented by reading out a program stored in a storage unit such as a ROM 212 to a RAM 211 and executing it by a CPU 210 of the printer.

In step S1401, the pull print application 304 determines whether it has accepted the status acquisition command 612 serving as a status acquisition request from the Web browser 301 or a status acquisition request from the print server 104. If the pull print application 304 has accepted the status acquisition request (YES in step S1401), the device monitoring unit 414 acquires the device status of a corresponding one of the printers 105 to 108 from the controller 209 and notifies the print server 104 of it in step S1402. The processing then ends. If the pull print application 304 has not accepted the status acquisition request (NO in step S1401), the processing ends.

As described above, according to the second embodiment, the status of even a printer which cannot directly communicate with the print server can be acquired via the Web browser which issues a print instruction. The printer status can be acquired before printing, presenting a list of printers capable of printing. Also, establishment of communication from the printer to the print server can be confirmed. Since the print server can directly acquire a printer status from the printer at the timing of a request, even consistency between a status managed by the print server and the printer status can be maintained.

Third Embodiment

The third embodiment adopts a unit for sending a status acquisition command 612 to a pull print application 304 of a printer to acquire a status simultaneously when a Web browser 301 displays a printer list screen 601. Further, the third embodiment employs a unit for additionally acquiring a status from the printer list screen 601 for a user-designated printer. In the third embodiment, for a printer which takes time to acquire a status, its status can be acquired in response to a user operation after displaying the printer list screen 601. In the third embodiment, an initial response to a list request from the user can be quickened by displaying the initial printer list screen 601 using information which has been acquired within a predetermined time, without waiting for the completion of time-consuming status acquisition.

[Screen Example]

Figure 6E:
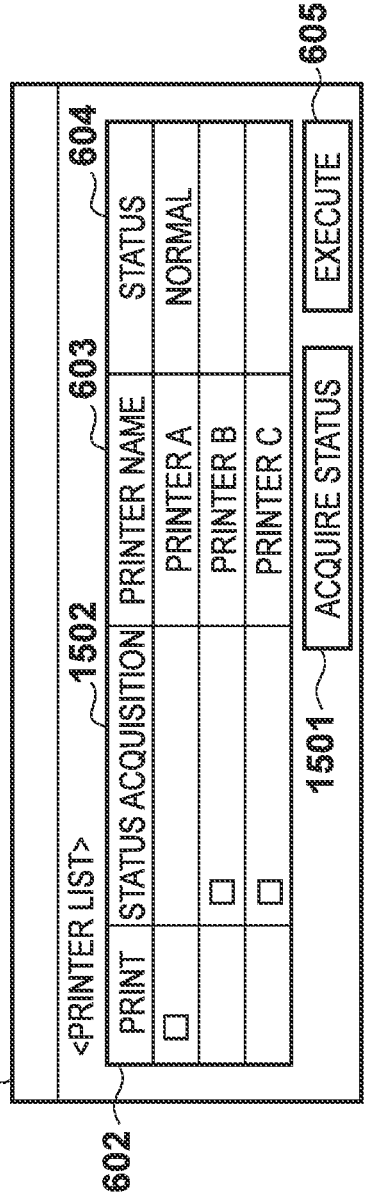

FIG. 6E exemplifies a Web screen which is created by a Web application 302 and displayed on the Web browser 301 of one of client terminals 101 to 103 in a printing system according to the third embodiment. A difference from the screen shown in FIG. 6A will be explained.

A status acquisition check box 1502 is used to designate, from the Web browser 301, printers 105 to 108 whose statuses are acquired after displaying the printer list screen 601. A status acquisition button 1501 is used to instruct the Web browser 301 about an operation of acquiring statuses from the printers 105 to 108 that are designated with the status acquisition check boxes 1502.

FIG. 7B exemplifies an html structure for implementing the third embodiment. This is an example of a status acquisition command with an html structure 611 to execute status acquisition when the user presses the status acquisition button 1501. In the html structure 611 of FIG. 7B, a status acquisition command 1503 is described to implement the status acquisition button 1501 in FIG. 6E. The status acquisition command 1503 is set longer than an execution timeout defined in the status acquisition command 612. This setting gives priority to display of the screen by quickly ending processing of the status acquisition command 612 on the display of the initial printer list screen 601. For a printer which takes time to acquire a status, its status is reacquired by executing the status acquisition command 1503 based on a user instruction.

For descriptive convenience, the status acquisition commands 612 and 1503 will also be called the first and second commands, respectively.

[Reply Processing Sequence]

FIG. 15 shows an operation sequence until a print server 104 replies to the Web browser 301 upon receiving a printer list request from the Web browser 301 of one of the client terminals 101 to 103 in the printing system according to the third embodiment. In the embodiment, this processing sequence is implemented by reading out a program stored in a storage unit such as a ROM 204 to a RAM 203 and executing it by a CPU 202 of the print server 104. This processing sequence corresponds to the processing in FIG. 9 described in the first embodiment.

Steps S1601 to S1606 and S1609 to S1612 are the same as steps S801 to S806 and S808 to S811 in FIG. 9, and a description thereof will not be repeated. In step S1607, the print server 104 describes, in the html structure 611, a description to display the status acquisition check box 1502 and a description about the status acquisition command 1503. At this time, the print server 104 sets a long timeout value in the status acquisition command 1503. In step S1608, the print server 104 describes the status acquisition command 612 in the Script area of the html structure 611. At this time, the timeout value is set shorter than one set in step S1607. The timeout values have relative lengths and are not particularly limited. However, to quickly display an initial list screen, it is desirable to set the value in step S1608 not to decrease use efficiency for the user.

In addition to the effects of the first embodiment, the third embodiment can present a list screen more quickly to the user and provide a necessary update screen.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-207154, filed Sep. 15, 2010, which is hereby incorporated by reference herein in its entirety.

What is claimed is:

1. A print server in a printing system including a client terminal having a Web browser, the print server, and a printer, comprising:
    a list request receiving unit configured to receive, from the client terminal, a printer list request containing information indicating a printer capable of printing;
    an acquisition unit configured to send a request to the printer to acquire a status indicating whether the printer can print, thereby acquiring the status; and
    a sending unit configured to send, to the client terminal that has sent the printer list request, printer list data described in a format for display on the Web browser of the client terminal using the status of the printer that has been acquired by said acquisition unit,
    wherein when said acquisition unit cannot acquire the status of the printer, said sending unit sends the printer list data containing a command which allows the Web browser of the client terminal to inquire a status of a printer whose status cannot be acquired.

2. The server according to claim 1, wherein
    said sending unit sets a first command and a second command as the command in the printer list data,
    the first command is executed by the Web browser upon sending the printer list data from the print server to the client terminal, and has a shorter timeout value than the second command to acquire a status from the printer, and
    the second command is executed by the Web browser when a user instructs the printer to reacquire a status, and has a longer timeout value than the first command to acquire a status from the printer.

3. The server according to claim 1, wherein when a printer contained in the printer list has a printable status in sending the printer list data to the client terminal, said sending unit sends the printer list data containing a description for displaying an item which allows a user to select the printer on the Web browser.

4. The server according to claim 1, wherein the printer list data sent by said sending unit is described in an HTML (HyperText Markup Language) format, and the command contained in the printer list data is described in JavaScript.

5. The server according to claim 1, wherein when the status of the printer cannot be acquired and the Web browser of the client terminal which has sent the printer list request has a cross domain communication function, said sending unit sets the command in the printer list data.

6. A client terminal in a printing system including the client terminal having a Web browser, a print server, and a printer, comprising:
    a list request sending unit configured to send a printer list request to the print server;
    a status acquisition unit configured to acquire a status from the printer in accordance with a command contained in printer list data received from the print server;
    an update unit configured to update the printer list data received from the print server using the status acquired by said status acquisition unit; and
    a display unit configured to display, by using the printer list data updated by said update unit, the printer list and an item that allows a user to select, on the Web browser, a printer capable of printing contained in the printer list.

7. A printing system including a client terminal having a Web browser, a print server, and a printer, wherein
    the print server includes
    a list request receiving unit configured to receive, from the client terminal, a printer list request containing information indicating a printer capable of printing,
    an acquisition unit configured to send a request to the printer to acquire a status indicating whether the printer can print, thereby acquiring the status, and
    a sending unit configured to send, to the client terminal that has sent the printer list request, printer list data described in a format for display on the Web browser of the client terminal using the status of the printer that has been acquired by said acquisition unit,
    when said acquisition unit cannot acquire the status of the printer, said sending unit sends the printer list data containing a command which allows the Web browser of the client terminal to inquire a status of a printer whose status cannot be acquired, and
    the client terminal includes
    a list request sending unit configured to send a printer list request to the print server,
    a status acquisition unit configured to acquire a status from the printer in accordance with the command contained in the printer list data received from the print server,
    an update unit configured to update the printer list data received from the print server using the status acquired by said status acquisition unit, and
    a display unit configured to display, by using the printer list data updated by said update unit, the printer list and an item that allows a user to select, on the Web browser, a printer capable of printing contained in the printer list.

8. A printing system including a client terminal having a Web browser, a print server, and a printer, wherein
    the print server includes
    a list request receiving unit configured to receive, from the client terminal, a printer list request containing information indicating a printer capable of printing,
    an acquisition unit configured to send a request to the printer to acquire a status indicating whether the printer can print, thereby acquiring the status, and
    a sending unit configured to send, to the client terminal that has sent the printer list request, printer list data described in a format for display on the Web browser of the client terminal using the status of the printer that has been acquired by said acquisition unit, when said acquisition unit cannot acquire the status of the printer, said sending unit sends the printer list data containing a command which allows the Web browser of the client terminal to inquire a status of a printer whose status cannot be acquired, the client terminal includes a list request sending unit configured to send a printer list request to the print server, an inquiry unit configured to inquire the status of the printer in accordance with the command contained in the printer list data received from the print server, and an update request unit configured to request the print server to update the printer list, the printer includes a notification unit configured to notify the print server of the status of the printer in accordance with an inquiry from the client terminal, and said sending unit of the print server updates the printer list data using the status notified by said notification unit of the printer, and sends the updated printer list data to the client terminal in accordance with an update request from the client terminal.

9. A method of controlling a print server in a printing system including a client terminal having a Web browser, the print server, and a printer, comprising:

a list request receiving step of causing a list request receiving unit to receive, from the client terminal, a printer list request containing information indicating a printer capable of printing;

an acquisition step of causing an acquisition unit to send a request to the printer to acquire a status indicating whether the printer can print, thereby acquiring the status; and a sending step of causing a sending unit to send, to the client terminal that has sent the printer list request, printer list data described in a format for display on the Web browser of the client terminal using the status of the printer that has been acquired in the acquisition step, wherein in the sending step, when the status of the printer cannot be acquired in the acquisition step, the printer list data containing a command which allows the Web browser of the client terminal to inquire a status of a printer whose status cannot be acquired is sent.

10. A non-transitory computer-readable medium storing a program for causing a computer to function as a list request receiving unit which receives, from the client terminal, a printer list request containing information indicating a printer capable of printing, an acquisition unit which sends a request to the printer to acquire a status indicating whether the printer can print, thereby acquiring the status, and a sending unit which sends, to the client terminal that has sent the printer list request, printer list data described in a format for display on the Web browser of the client terminal using the status of the printer that has been acquired by said acquisition unit, wherein when said acquisition unit cannot acquire the status of the printer, said sending unit sends the printer list data containing a command which allows the Web browser of the client terminal to inquire a status of a printer whose status cannot be acquired.

* * * * *